United States Patent
Demaj et al.

(10) Patent No.: US 9,838,077 B2
(45) Date of Patent: Dec. 5, 2017

(54) METHOD FOR ESTIMATING A CYCLOSTATIONARY TRANSMISSION CHANNEL, AND CORRESPONDING RECEIVER

(71) Applicant: STMICROELECTRONICS (ROUSSET) SAS, Rousset (FR)

(72) Inventors: Pierre Demaj, Nice (FR); Yoann Bouvet, Opio (FR)

(73) Assignee: STMicroelectronics (Rousset) SAS, Rousset (FR)

(*) Notice: Subject to any disclaimer, the term of this patent is extended or adjusted under 35 U.S.C. 154(b) by 23 days.

(21) Appl. No.: 15/042,509

(22) Filed: Feb. 12, 2016

(65) Prior Publication Data

US 2017/0012666 A1    Jan. 12, 2017

(30) Foreign Application Priority Data

Jul. 9, 2015 (FR) ..................................... 15 56488

(51) Int. Cl.
*H04B 3/54* (2006.01)
*H04L 5/00* (2006.01)
*H04L 27/26* (2006.01)

(52) U.S. Cl.
CPC .............. *H04B 3/54* (2013.01); *H04L 5/0007* (2013.01); *H04L 5/0044* (2013.01); *H04L 27/2601* (2013.01); *H04L 27/2647* (2013.01)

(58) Field of Classification Search
CPC .. H03M 7/20; H04B 3/46; H04B 3/54; H04B 3/542; H04B 7/04; H04B 15/00;
(Continued)

(56) References Cited

U.S. PATENT DOCUMENTS 6,314,131 B1  11/2001  Roe et al.
6,924,763 B2   8/2005  Poullin
(Continued)

FOREIGN PATENT DOCUMENTS

JP  2007258897  10/2007
JP  2009089146   4/2009
WO  2014037066   3/2014

OTHER PUBLICATIONS

Bogdanovic et al., "Improved least square channel estimation algorithm for OFDM based communication over power lines", The Mediterranean Journal of Computers and Networks, Jul. 2014, pp. 232-238.
(Continued)

*Primary Examiner* — Shawkat M Ali
(74) *Attorney, Agent, or Firm* — Slater Matsil, LLP

(57) ABSTRACT

A method is for processing an analog channel signal from a transmission channel. The analog channel signal conveys frames, the transmission channel being linear and cyclostationary for a duration of a frame. The method may include converting of the analog channel signal into a digital channel signal, and performing channel estimations for the frame based upon the digital channel signal to generate a sequence of N transfer functions of the transmission channel. Each of the sequence of N transfer functions may be respectively associated with N successive time slices. The method may include decoding at least some symbols of the frame using, for each of the symbols, a transfer function associated with a successive time slice including a respective symbol.

33 Claims, 8 Drawing Sheets

(58) Field of Classification Search
CPC ..... H04B 17/00; H04J 3/16; H04J 3/24; H04J 3/1694; H04J 11/00; H04J 11/0056; H04K 1/10; H04L 5/00; H04L 5/007; H04L 5/0023; H04L 5/0044; H04L 5/0073; H04L 7/00; H04L 12/26; H04L 25/02; H04L 25/0228; H04L 27/01; H04L 27/06; H04L 27/26; H04L 27/2601; H04L 27/2662
USPC ....... 370/206, 208, 241, 252, 342, 347, 443; 375/227, 232, 257, 260, 340, 341
See application file for complete search history.

(56) References Cited

U.S. PATENT DOCUMENTS

| | | |
|---|---|---|
| 2003/0063596 A1 | 4/2003 | Arslan et al. |
| 2004/0184399 A1* | 9/2004 | Chiou ................. H04L 25/0232 370/206 |
| 2008/0056343 A1* | 3/2008 | Rajagopal ......... H04L 25/03006 375/232 |
| 2010/0067629 A1 | 3/2010 | Gaddam et al. |
| 2010/0124289 A1 | 5/2010 | Yonge, III et al. |
| 2011/0075588 A1* | 3/2011 | Carlsson ............. H04L 43/0852 370/252 |
| 2011/0081869 A1* | 4/2011 | Breit .................... H04B 7/0413 455/67.11 |
| 2011/0200058 A1* | 8/2011 | Mushkin ............... H04L 5/0046 370/475 |
| 2011/0267956 A1* | 11/2011 | Yonge, III ............ H04L 12/413 370/241 |
| 2012/0143553 A1 | 6/2012 | Feistel et al. |
| 2012/0195384 A1 | 8/2012 | Sato |
| 2013/0051268 A1* | 2/2013 | Nassar ..................... H04B 3/54 370/252 |
| 2013/0051482 A1 | 2/2013 | Nassar et al. |
| 2013/0170539 A1 | 7/2013 | Huang et al. |
| 2014/0064348 A1 | 3/2014 | Braz et al. |
| 2014/0355621 A1 | 12/2014 | Katar et al. |
| 2015/0280888 A1 | 10/2015 | Karsi et al. |
| 2016/0142175 A1* | 5/2016 | Waheed ................ H04L 1/0003 370/329 |
| 2016/0285509 A1 | 9/2016 | Wallis |

OTHER PUBLICATIONS

Donlan, "Ultra-wideband narrowband interference cancellation and channel modeling for communications", Jan. 2005, pp. 1-113.
Demaj et al, U.S. Appl. No. 15/053,264, filed Feb. 25, 2016.
Demaj et al, U.S. Appl. No. 15/042,326, filed Feb. 12, 2016.
Bouvet et al, U.S. Appl. No. 15/042,429, filed Feb. 12, 2016.
Tunic, "LPTV-Aware Bit Loading and Channel Estimation in Broadband PLC for Smart Grid," May 5, 2014, pp. 1-97.

* cited by examiner

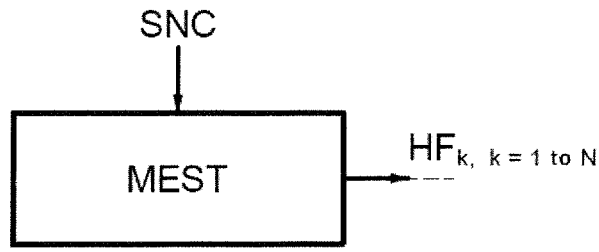
FIG. 7
FIG. 8
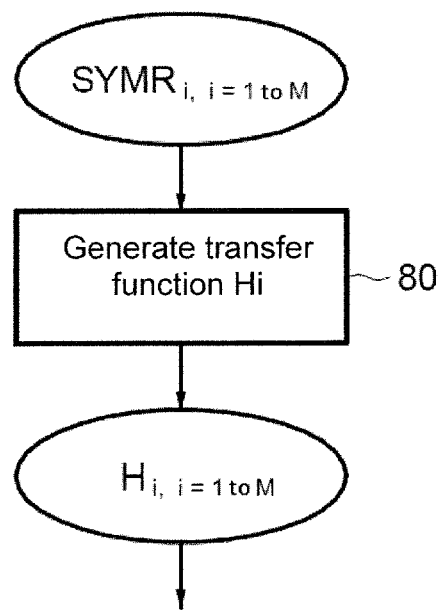

METHOD FOR ESTIMATING A CYCLOSTATIONARY TRANSMISSION CHANNEL, AND CORRESPONDING RECEIVER

RELATED APPLICATION

This application is based upon prior filed copending French Application No. 1556488 filed Jul. 9, 2015, the entire subject matter of which is incorporated herein by reference in its entirety.

TECHNICAL FIELD

The present disclosure is directed to transmission of information over a transmission channel, and in particular, the transmission of information by power line communications (PLC).

BACKGROUND

Power line communications (PLC) technology is aimed at transmitting digital data by utilizing the existing infrastructure of the electrical grid. It allows, in particular, remote reading of electric meters, exchanges between electric vehicles and the recharging terminals and also management and control of energy networks (smart grid). PLC technology incorporates, in particular, narrow band power line communication (N-PLC) which is generally defined as a communication over an electrical line operating at transmission frequencies of up to 500 KHz. N-PLC communication thus generally uses the frequency bands defined in particular by the European committee for electrotechnical standardization (CENELEC) or by the Federal Communications Commission (FCC). Thus, if the CENELEC A frequency band (3-95 kHz) is considered, the transmission frequencies are situated between 35.9375 and 90.625 KHz for the PLC-G3 standard.

The overall performance of a receiver depends on the quality of its channel estimation, i.e. on the estimation of the transfer function of this channel. It is known that a transmission channel can vary in time, in frequency, in phase and in amplitude. Moreover, the signals conveyed by power line communications and received by the receiver result from a combination of several signals having followed within the transmission channel (i.e. the electrical line) several propagation routes or paths, each having its own time delay and its own attenuation (i.e. the transmission channel is a multi-path transmission channel). This may then result in strong attenuation of certain frequencies.

Moreover, the properties and characteristics of the electrical networks are not known and may vary over time. Thus, the impedances of certain objects plugged in by the user vary with the voltage. Such is the case, for example, with halogen lamps or objects comprising voltage rectifiers. When a user plugs in such objects, it results in a periodic variation of the transfer function of the transmission channel. The channel is then considered to be linear and cyclostationary or "linear and varying temporally in a periodic manner", this corresponding to the acronym LPTV ("Linear Periodically Time Varying").

Contemporary receivers, compatible with the PLC-G3 standard, are not suitable for performing channel estimations when the channel is time varying. Indeed, the PLC-G3 standard provides for the use of only two orthogonal frequency-division multiplexing (OFDM) symbols as pilot symbols to fully estimate the transfer function of the channel. Hence, when the channel varies, and in particular, when a cyclostationary channel is present, channel estimation may be erroneous, or perhaps impossible, and consequently potentially leads to errors in decoding the symbols.

SUMMARY

Generally speaking, a method is for processing an analog channel signal from a transmission channel. The analog channel signal conveys a plurality of frames, the transmission channel being linear and cyclostationary for a duration of at least one frame. The method may include converting of the analog channel signal into a digital channel signal, and performing a plurality of channel estimations for the at least one frame based upon the digital channel signal to generate a sequence of N transfer functions of the transmission channel. Each of the sequence of N transfer functions may be respectively associated with N successive time slices. A duration of the N successive time slices may be equal to or less than a cyclostationary period of the transmission channel. The method may include decoding at least some symbols of the at least one frame using, for each of the at least some symbols, a transfer function associated with a successive time slice including a respective symbol.

BRIEF DESCRIPTION OF THE DRAWINGS

FIGS. 7-11 are flowcharts illustrating methods, according to the present disclosure.

DETAILED DESCRIPTION

Figure 1:
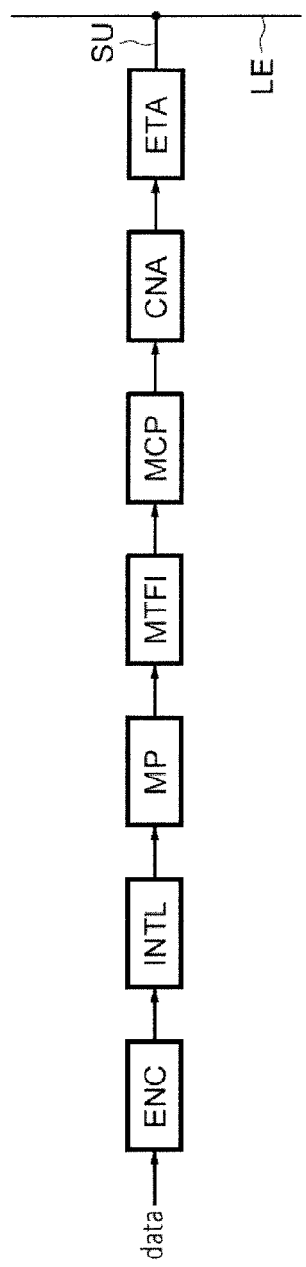
FIG. 1 is a schematic diagram of a sender, according to the present disclosure.

According to an embodiment, a channel estimation applicable to a channel is considered to be cyclostationary, and compatible with the PLC-G3 standard. According to an aspect, a method for processing an analog channel signal deriving from a transmission channel (for example, an electrical line, the signal then being conveyed by PLC), the analog channel signal conveying symbol frames (TRM), and the transmission channel being considered to be linear and cyclostationary for the entire duration of at least one frame. The method comprises an analog-digital conversion of the analog channel signal so as to obtain a digital channel signal, and a plurality of channel estimations performed for the at least one frame on the basis of the digital channel signal so as to formulate a sequence of N transfer functions of the transmission channel which are respectively associated with N successive time slices. The total duration of the N time slices is equal to almost the whole of the cyclostationary period of the channel or to the whole of the period. The method includes a decoding of at least some of the symbols of the at least one frame by using for each of these symbols the transfer function associated with the time slice containing the symbol.

The total duration of the N time slices is slightly greater than the cyclostationary period when the latter is not an integer multiple of the duration of a time slice. Thus, in this case this cyclostationary period lies between N times and N+1 times the duration of a time slice. The total duration of the N time slices is equal to the cyclostationary period when the latter is an integer multiple of the duration of a time slice.

The analog channel signal which will undergo the analog-digital conversion may be, for example, the analog signal directly deriving from the channel or else as is generally the case, the analog signal delivered by an analog input stage (in particular comprising band pass filters, low-pass filters and an amplifier) connected to the transmission channel. The analog channel signal is, for example, compliant with the PLC-G3 standard.

The channel is considered to be cyclostationary for the entire duration of the at least one frame. Of course the channel may be cyclostationary in the course of several frames, successive or not, and in this case the various above-mentioned steps of the method are advantageously applied for each of these frames, the state of the channel during the reception of each of these frames being considered to be cyclostationary for the entire duration of the frame considered.

According to an embodiment, the formulation of the sequence of N transfer functions comprises a formulation of an initial sequence of M transfer functions respectively associated with M successive reference symbols of the at least one frame, the M reference symbols temporally covering a duration equal to or slightly greater than the whole of the cyclostationary period, the N transfer functions being derived from these M transfer functions. The total duration of the M reference symbols is slightly greater than the cyclostationary period when the latter is not an integer multiple of the duration of a reference symbol. Thus in this case this cyclostationary period lies between M−1 times and M times the duration of a reference symbol. The total duration of the M reference symbols is equal to the cyclostationary period when the latter is an integer multiple of the duration of a reference symbol.

By way of example, when the signal complies with the PLC-G3 standard, the number M of reference symbols can be equal to 15 and then together extend over a duration equal to 10.42 ms (since each reference symbol has a duration equal to 0.695 ms). This total duration of 10.42 ms is slightly greater than the possible cyclostationary period of the channel (10 ms) which is equal to half the period of the alternating current intended to flow on the electrical line (i.e. 20 ms for a frequency of 50 Hz). In the same manner, in countries where the mains frequency is 60 Hz, the cyclostationary period of the channel is equal to 8.33 ms and the number M of reference symbols can be taken to be equal to 12.

Whereas it would be possible to use fourteen of these fifteen transfer functions for the decoding of the symbols of the useful field "payload") of the frame, it turns out to be preferable, in order to obtain a better signal-to-noise ratio, to use only seven transfer functions (N=7). Thus, N is less than M and the N transfer functions may be, for example, the averages of successive groups of at least some of the M successive transfer functions of the initial sequence. When M is equal to 15 and N is equal to 7, the N transfer functions can thus be the pair wise (or 2×2) averages of fourteen successive transfer functions of the initial sequence.

On the emission side, the analog channel signal derives from a digital-analog conversion of an initial digital signal, and when the sampling frequency of the digital channel signal (on reception) is different from the sampling frequency of the initial digital signal (on emission), it is preferable to take account of this shift of sampling frequency (or "sampling frequency offset") to correct the transfer functions.

Thus according to one embodiment, the plurality of channel estimations comprises estimations of M base transfer functions respectively performed on the basis of the M reference symbols of the received frame, and a processing for correcting these M base transfer functions with a phase shift corresponding to this shift of sampling frequency so as to obtain the M transfer functions. The reference symbols of the received frame, on the basis of which symbols the various transfer functions will be determined, are, for example, symbols of the received frame corresponding to known symbols of the transmitted frame and/or are decodable symbols that can be decoded without knowing the transfer function of the transmission channel.

Thus, in the case of the PLC-G3 standard, each received frame comprises a preamble followed by a header followed by a useful field, and the reference symbols can comprise the symbols of the header of a frame, which are decodable without knowing the transfer function of the transmission channel since they are coded in a differential manner, as well as the two symbols of the useful field ("payload") of the frame which correspond to the two known symbols S1, S2 of the useful field of the transmitted frame.

It will therefore be noted here that although the PLC-G3 standard provides for only two known symbols, namely the symbols S1 and S2, as pilot symbols for the estimation of the transfer function of the channel, provision is advantageously made here to increase this number of pilot symbols by advantageously using the symbols of the header of a frame which are decodable without making it necessary to know the transfer function of the channel. It is then readily possible to detect temporal variations, if any, of the cyclostationary transmission channel.

That being so, it would also have been possible to also use all or some of the known symbols of the preamble of a frame as reference symbols so as to improve the channel estimation or to increase the number of estimations if the duration of the header and of the symbols S1 and S2 is shorter than the duration of a half-period of the alternating signal conveyed by the channel (half-period of the mains).

According to an embodiment, each channel estimation performed on the basis of a decodable symbol received (a symbol of the header, e.g.) comprises a decoding of the symbol received, a re-encoding of this decoded symbol so as to obtain a re-encoded symbol and a determination of the transfer function of the channel on the basis of the re-encoded symbol and of the decodable symbol received. The decoding of the symbols according to the last reference symbol then uses advantageously successively and cyclically the transfer functions of the sequence of N transfer functions (N=7 e.g.).

When the duration of the N time slices is different from the cyclostationary period, that is to say when this cyclostationary period is not an integer multiple of the duration of a symbol, the decoding of symbols following the last reference symbol also periodically comprises a shift of transfer function in the successive and cyclic use of the transfer functions. Thus, for example, it will be possible, at a given moment and periodically, to use the same transfer function twice running before resuming the normal cycle of the transfer functions.

When the signal is conveyed by PLC, the cyclostationary period of the channel is equal to half the period of the alternating signal (current or voltage) intended to flow on the electrical line. In such an application, a reference signal is delivered at each "0" crossing of the alternating signal (this is a signal known to the person skilled in the art by the name of "zero-crossing" signal). In this case, the value of the cyclostationary period of the channel can be advantageously adjusted on the basis of the occurrences of the reference signal.

According to another aspect, a receiver comprises an input stage intended to be connected to a transmission channel and configured to deliver an analog channel signal deriving from the transmission channel, and an analog-digital stage for converting the analog channel signal so as to deliver a digital channel signal and means for processing or a processor the digital channel signal. The analog channel signal conveys frames of symbols and the transmission channel being considered to be linear and cyclostationary for the entire duration of at least one frame. The receiver also includes estimation means or an estimator configured to perform a plurality of channel estimations for the at least one frame on the basis of the digital channel signal so as to formulate a sequence of N transfer functions of the transmission channel which are respectively associated with N successive time slices, the total duration of the N time slices being equal to almost the whole of the cyclostationary period of the channel or to the whole of the period, and decoding means or a decoder configured to decode at least some of the symbols of the at least one frame by using for each of these symbols the transfer function associated with the time slice containing the symbol.

The estimation means may comprise formulation means or a calculator configured to formulate an initial sequence of M transfer functions respectively associated with M successive reference symbols of the at least one frame, the M reference symbols temporally covering a duration equal to or slightly greater than the whole of the period, and to determine the N transfer functions on the basis of these M transfer functions.

Also, the analog channel signal may derive from a digital-analog conversion of an initial digital signal, and when the sampling frequency of the digital signal is different from the sampling frequency of the initial digital signal, the formulation means are furthermore configured to perform estimations of M base transfer functions respectively on the basis of the M reference symbols of the received frame, and a processing for correcting these M base transfer functions with a phase shift corresponding to this shift of sampling frequency so as to deliver the M transfer functions. The formulation means are advantageously configured to perform the averages of successive groups of at least some of the successive transfer functions of the initial sequence so as to obtain the N transfer functions.

According to an embodiment, the reference symbols of the received frame correspond to known symbols of the transmitted frame and/or are decodable symbols that can be decoded without knowing the transfer function of the transmission channel. The estimation means are advantageously configured to perform a decoding of a decodable symbol received, a re-encoding of this decoded symbol so as to obtain a re-encoded symbol and a determination of the transfer function associated with this decodable symbol received, on the basis of the re-encoded symbol and of the decodable symbol received. The signal is, for example, modulated according to an OFDM modulation.

Additionally, the transmission channel is an electrical line, the signal is intended to be conveyed by PLC and the possible cyclostationary period of the channel is half the period of the alternating current intended to flow on the electrical line. The analog channel signal is, for example, compliant with the PLC-G3 standard. In this case, each received frame comprises a preamble followed by a header followed by a useful field and the reference symbols comprise, for example, the symbols of the header and two symbols of the useful field corresponding to two known symbols of the transmitted frame. When M is equal to 15, N is, for example, equal to 7, and the formulation means are configured to perform the pair wise averages of fourteen successive transfer functions of the initial sequence so as to obtain the N transfer functions.

Moreover, the decoding means are configured to use successively and cyclically the transfer functions of the sequence of N transfer functions so as to decode the symbols following the last reference symbol. When the duration of the N time slices is different from the cyclostationary period, the decoding means are advantageously configured to periodically perform a shift of transfer function in the successive and cyclic use of the transfer functions so as to decode the symbols following the last reference symbol.

The signal is intended to be conveyed by PLC, the cyclostationary period of the channel is half the period of the alternating current intended to flow on the electrical line, the input stage is configured to deliver furthermore a reference signal at each zero crossing of the alternating current, and the estimation means are configured to adjust the value of the cyclostationary period of the channel on the basis of the occurrences of the reference signal. The modes of implementation and embodiments which will now be described are described within the context of a transmission of information by PLC compliant with the PLC-G3 standard, although the invention is not limited to this type of application.

Throughout what follows, each time that the PLC-G3 standard is cited, it will be assumed that the CENELEC A frequency band (3-95 kHz) is considered. FIG. 1 is now referred to in order to schematically illustrate an exemplary sender capable of transmitting a useful signal SU on an electrical line LE by PLC. The transmission chain comprises, for example, an encoder ENC, for example, a convolutional encoder, receiving the data to be transmitted from source coding means or a software source. Interleaving means or an interleaver INTL are connected to the output of the encoder and are followed by "mapping" means or a mapper which transform the bits into symbols according to a transformation scheme dependent on the type of modulation used, for example, a modulation of binary phase-shift keying (BPSK) type or more generally a quadrature amplitude modulation (QAM) modulation.

Figure 2:
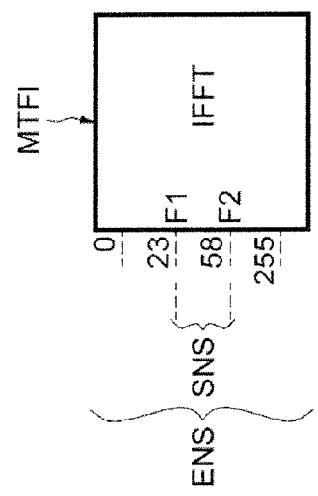
FIG. 2 is a schematic diagram of modulated carriers form a subset of carriers from among an available set of carriers, according to the present disclosure.

Each symbol contains modulation coefficients associated with carriers which will be modulated accordingly. The symbols are delivered as input to processing means or a processor MTFI intended to perform an inverse fast Fourier transform (IFFT) operation. It will be noted here while referring more particularly to FIG. 2, that the modulated carriers form a subset SNS of carriers from among an available set ENS of carriers (which set corresponds to the size of the inverse Fourier transform).

Thus, in the PLC-G3 standard, the size of the inverse Fourier transform is equal to 256 while the modulated carriers of the subset SNS lie between the ranks 23 and 58, this corresponding to a frequency band F1-F2 lying between 35.9375 and 90.625 kHz. The sampling frequency is here equal to 400 kHz leading to an inter-carrier spacing equal to 1.5625 kHz, this thereby rendering the frequencies orthogonal (OFDM modulation). The modulation coefficients associated with the unused carriers are equal to 0.

The OFDM signal in the time domain is generated as output from the processing means MTFI, and means MCP add to each OFDM symbol in the time domain, a cyclic prefix which is a copy at the head of the OFDM symbol of a certain number of samples situated at the end of this symbol. By way of example, in the PLC-G3 standard, the length of the cyclic prefix is 30 samples for a sampling frequency of 400 kHz. The signal is thereafter converted in a digital-analog converter DAC and then processed in a stage ETA, commonly referred to by the person skilled in the art by the designation "Analog Front End", where it undergoes in particular a power amplification, before being transmitted on the electrical line LE.

Figure 3:
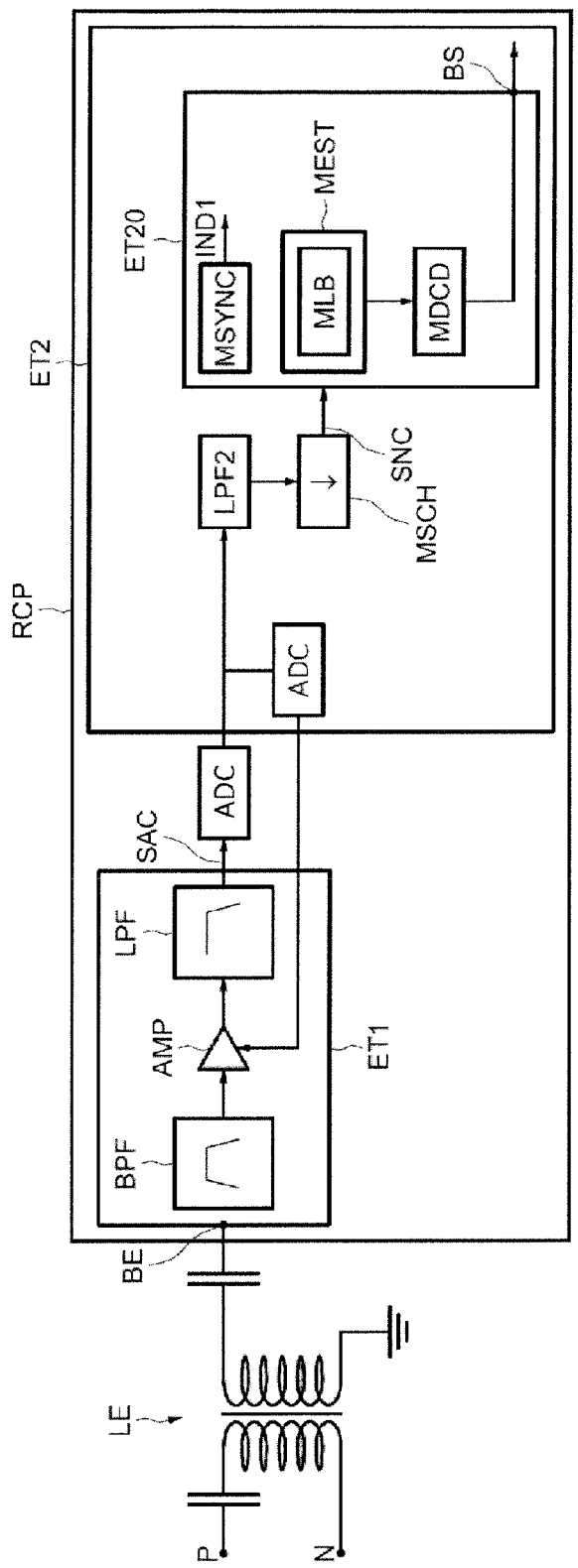
FIG. 3 is a schematic diagram of a receiver, according to the present disclosure.

On reception, it is seen, by referring more particularly to FIG. 3, that here the receiver RCP comprises an analog input stage ET1 whose input terminal BE is connected to the electrical line LE. This analog input stage ET1 comprises in a conventional manner a band pass filter BPF, a low-pass filter LPF, as well as amplification means or an amplifier AMP. The output of the stage ET1 is connected to an analog-digital conversion stage ADC whose output is connected to the input of processing means or stage ET2.

The processing stage ET2 here comprises automatic gain control AGC means or an automatic gain control circuit making it possible to control the value of the gain of the amplification means AMP of the stage ET1. The signal SAC delivered as output from the analog stage ET1 and as input to the analog-digital conversion ADC stage designates an analog channel signal deriving from the transmission channel (electrical line) LE.

The processing stage ET2 also comprises a low-pass filter LPF2 followed, although this is not indispensable, by sub-sampling means or a sub-sampler MSCH. The sampling frequency of the signal upstream of the means MSCH is denoted Fs while the sampling frequency of the signal at the output of the means MSCH is denoted Fss.

The signal SNC output by the means MSCH then designates here a digital channel signal which derives from the analog-digital conversion of the analog channel signal SAC and on which in particular a synchronization processing, channel estimations and decoding operations of symbols will be applied as will be seen in greater detail hereinafter. The channel estimations are performed once synchronization has been acquired. The frequency Fc designates the calculation frequency at which the various processing operations will be performed. In the PLC-G3 standard, for example, the sampling frequency Fs specified is 400 kHz for an EFT size of 256.

Although it had been possible to perform all the operations of these various processing operations at a calculation frequency Fc equal to the sampling frequency Fs of 400 kHz, the fact of under-sampling the signal at a frequency Fss less than Fs and of performing all the operations at the calculation frequency Fc equal to Fss makes it possible to reduce the complexity of implementation of the processing stage and also makes it possible to perform a direct fast Fourier transform (FFT) processing having a reduced size with respect to the specified size of 256.

Figure 4:
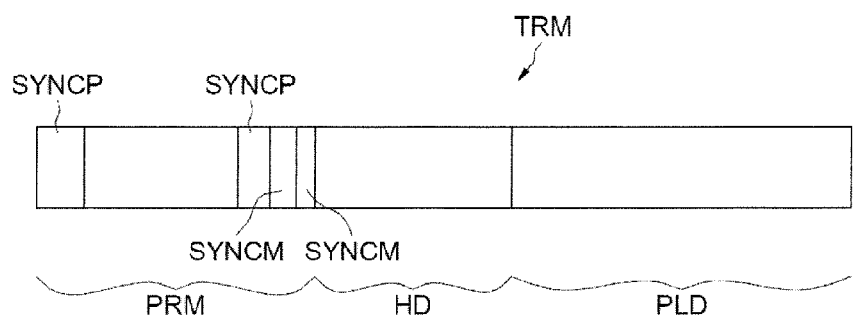
FIG. 4 is a schematic diagram of a frame structure, according to the present disclosure.

Before returning in greater detail to the various means/circuitry, which are incorporated into the processing stage ET2, we now refer more particularly to FIG. 4 to illustrate the structure of a frame conveying symbols, for example, within the context of the PLC-G3 standard. The frame received TRM comprises a preamble PRM comprising here eight known symbols SYNCP followed by a symbol of opposite phase SYNCM, itself followed by a half-symbol SYNCM.

The frame TRM thereafter comprises a header HD followed by a useful field PLD containing symbols of useful data to be decoded and better known by the person skilled in the art as a "payload". The symbols of the header HD contain, in particular, control information for the decoding of the data of the field PLD as well as the number of bytes to be decoded in the field PLD.

The preamble PRM of the frame TRM allows the receiver to synchronize itself, that is to say to obtain an indication IND1 making it possible to retrieve the structure of the frame so as to be able to tag the start of the header HD. The transmission channel is a linear channel, that is to say that it behaves as a linear filter.

It is considered here furthermore that for a considered frame the channel is linear and cyclostationary (LPTV) for the whole of the frame. The transmission channel is cyclostationary during the reception of one or more frames, because, for example, halogen lamps or objects comprising voltage rectifiers are plugged in on the electrical line. The channel is then periodic in amplitude and in phase in a manner synchronized with the alternating current or voltage present on the electrical line. Stated otherwise, for a cyclostationary channel, the characteristics of its transfer function vary in the course of the channel's cyclostationary period but repeat periodically thereafter.

Figure 6:
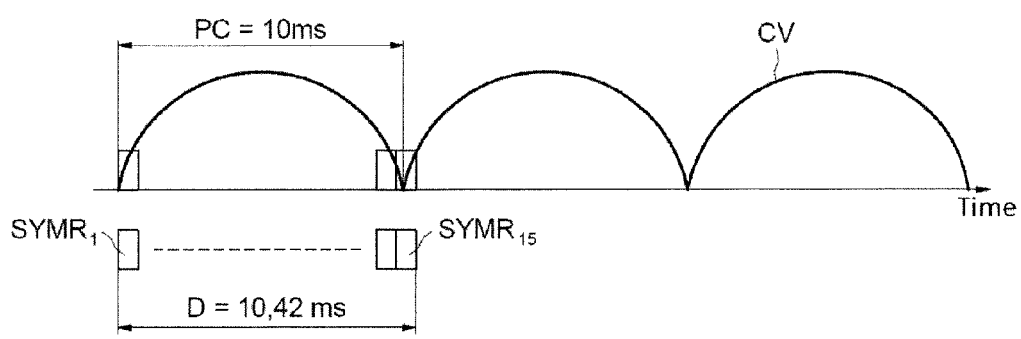
FIG. 6 is a schematic diagram of reference symbols, according to the present disclosure.

In FIG. 6, the curve CV schematically represents the periodic variations of the channel and, in this figure, the reference PC designates the cyclostationary period of the channel which is equal to half the period of the alternating current or voltage present on the line. Thus, for a current and voltage alternating at 50 Hz, the cyclostationary period PC of the channel is equal to 10 ms.

In certain applications for which the electrical environment of the channel is known and comprising, for example, objects of the halogen lamp and/or voltage rectifier type, connected on the electrical line, the transmission channel can be considered de facto as cyclostationary in the course of the frames received. In other applications, the knowledge of the cyclostationary state of the channel in the course of the frame considered may result, for example, from a prior detection of the state of the channel, in particular, but not in a limiting manner, to that described in the French patent application in the name of the Applicant, titled "Procédé de traitement d'un signal issu d'un canal de transmission, en particulier un signal véhiculé par courant porteur en ligne, et notamment l'estimation du canal, et récepteur correspondant", [Method for processing a signal deriving from a transmission channel, in particular a signal conveyed by PLC, and in particular the estimation of the channel, and corresponding receiver], and filed on the same day as the present application parent foreign priority application.

Now referring again to FIG. 3, it is seen that the processing stage ET2 comprises a sub-stage ET20 incorporating various means/circuitry that will now be described in a functional manner. These various means/circuitry can be achieved in a software manner within a microprocessor, for example, then forming at least in part the sub-stage ET20. Featuring in a conventional manner among these various means/circuitry are synchronization means or a synchronizer MSYNC allowing the receiver to synchronize itself, that is to say to obtain the indication IND1 making it possible to retrieve the structure of the frame, so as to be able to tag the start of the header HD. These synchronization means can be of conventional structure known per se or else, as a variant, those incorporating the filtering means or a filter described in French patent application No. 1552588.

Featuring among the other means/circuitry incorporated into the sub-stage 20 are estimation means NEST configured, as will be seen in greater detail hereinafter, to perform a plurality of channel estimations for the frame considered on the basis of the digital channel signal SNC so as to formulate a sequence of N transfer functions of the transmission channel which are respectively associated with N successive time slices, the total duration of the N time slices being equal to almost the whole of the cyclostationary period (PC) of the channel or to the whole of the period (PC).

The estimation means comprise here formulation means MLB configured, as will be seen in greater detail hereinafter, to formulate an initial sequence of M transfer functions respectively associated with M successive reference symbols of the frame considered, the M reference symbols temporally covering a duration equal to or slightly greater than the whole of the period, and to determine the N transfer functions on the basis of these M transfer functions.

Decoding means MDCD of conventional structure are then configured to decode at least some of the symbols of a frame, in particular the symbols of the useful field PLD of the frame, by using for each of these symbols the transfer function associated with the time slice containing the symbol. Here again, this decoding will be returned to in greater detail hereinafter.

Figure 5:
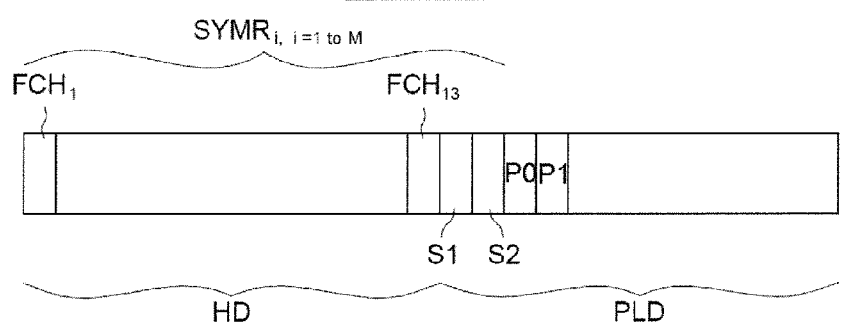
FIG. 5 is a schematic diagram of a frame structure, according to the present disclosure.

Referring now more particularly to FIG. 5, it is seen that the header HD of the frame received TRM comprises thirteen symbols $FCH_1$-$FCH_{13}$ which have been coded on emission in a differential manner and which are each referenced with respect to the preceding symbol. The frame TRM moreover comprises at the start of the useful field PLD, two symbols corresponding to two known transmitted symbols S1, S2. That being so, for the sake of simplification these two symbols received will also be designated by S1 and S2. The thirteen symbols $FCH_i$ and the two symbols S1 and S2 here form M reference symbols $SYMR_i$ (M is equal to 15 in this example). These reference symbols will be used to perform the channel estimations.

Referring again to FIG. 6, it is seen that, since in the PLC-G3 standard, each reference symbol $SYMR_i$ has a duration equal to 0.695 ms, the set of the 15 reference symbols $SYMR_1$-$SYMR_{15}$ extend temporally over a total duration equal to 10.42 ms which is therefore here slightly greater than the cyclostationary period PC. Stated otherwise, in the present case, the cyclostationary period PC is not an integer multiple of the duration of a reference symbol and it lies between 14 times 0.695 ms and 15 times 0.695 ms.

We shall now describe in greater detail the channel estimation phase by referring more particularly to FIGS. 7 to 11. This estimation phase is performed once the synchronization of the receiver has been acquired. This estimation phase is performed here at each frame reception for which the channel is cyclostationary, and we shall now describe the processing operations performed in the course of one of these frames.

As illustrated in FIG. 7, a plurality of channel estimations performed respectively by the estimation means NEST on the basis of the digital channel signal SNC will make it possible to obtain the N transfer functions of the channel $HF_k$ respectively associated with the N time slices mentioned hereinabove. In this regard and in a preferential manner, as illustrated in FIG. 8, the formulation means MLB formulate in step 80 a transfer function $H_i$ of the channel for each reference symbol $SYMR_i$. More precisely, this transfer function $H_i$ is equal to the product of the reference symbol received $SYMR_i$ times the complex conjugate of the corresponding symbol transmitted by the sender on the transmission channel. In the present case, in compliance with the PLC-G3 standard, this transfer function $H_i$ is in fact a complex vector having 36 complex components corresponding respectively to the 36 tones of the symbol.

On completion of step 80, an initial sequence of M (=15) transfer functions $H_1$-$H_{15}$ is therefore obtained, corresponding respectively to the M (=15) reference symbols $SYMR_1$-$SYMR_{15}$. In the mode of implementation which has just been described, it was assumed that the emission-side sampling frequency was identical to the sampling frequency of the digital channel signal SNC. That being so, as indicated hereinabove, the sampling frequency of the digital signal SNC can be different from the initial digital signal formulated in the sender. This case results in a shift of sampling frequency known to the person skilled in the art by the expression "sampling frequency offset" that has to be taken into account in the estimation of the transfer functions $H_1$.

Figure 9:
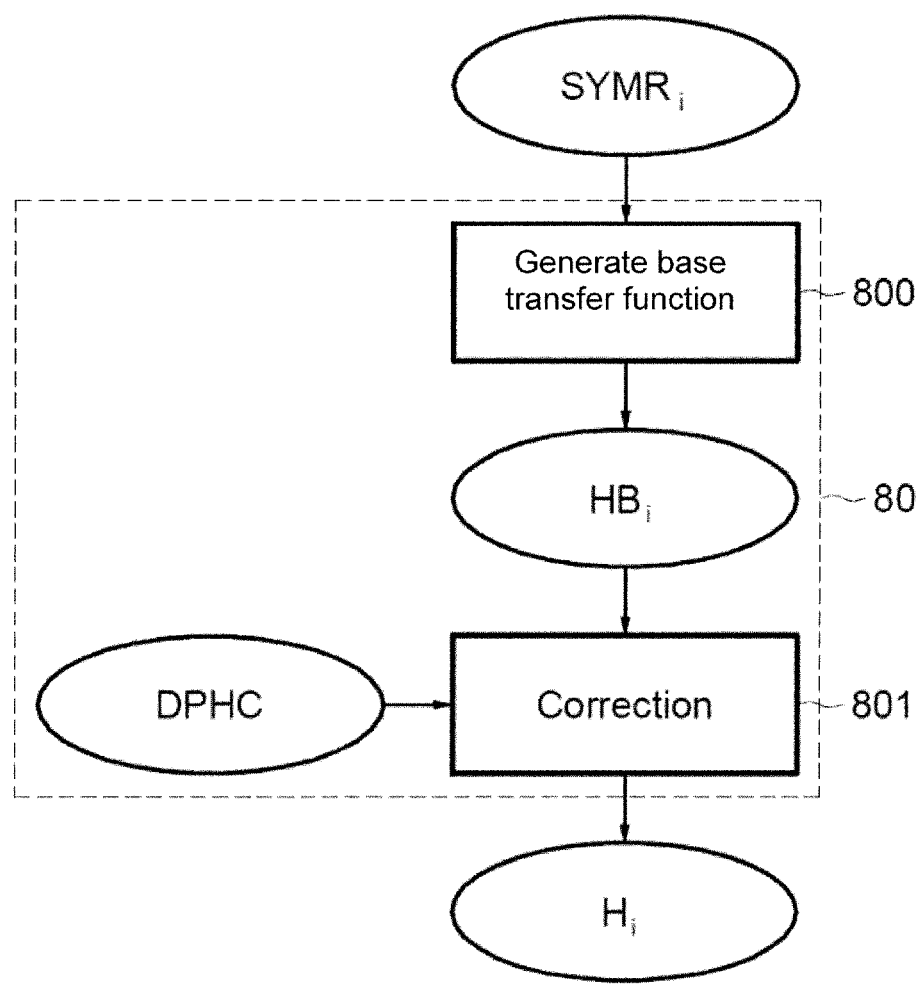

This is illustrated schematically in FIG. 9. More precisely, base transfer functions HBi respectively associated with the reference symbols $SYMR_i$ are determined in step 800 in a manner analogous to what was described in step 80 of FIG. 8.

Next, the frequency shift ("sampling frequency offset") is estimated using, for example, two base transfer functions that are relatively far apart temporally, for example, the transfer functions $HB_1$ and $HB_{13}$. The resulting phase shift is then obtained by performing the product of the transfer function $HB_1$ times the complex conjugate of the transfer function $HB_{13}$, the whole divided by the number of symbols. A phase shift correction DPHC is then obtained and which is applied in a step 801 to correct the M transfer functions $HB_i$ and obtain the M transfer functions $H_i$.

The estimation of a transfer function on the basis of each of the symbols S1 and S2 can be performed without difficulty since the transmitted symbols corresponding to the symbols S1 and S2 received are known. On the other hand, such is not the case for the reference symbols of the header, that is to say the symbols $FCH_i$. Nonetheless, as indicated hereinabove, these symbols $FCH_i$ were coded at the sending end in a differential and particularly robust manner. Their decoding does not therefore require knowledge of the channel transfer function.

Figure 10:
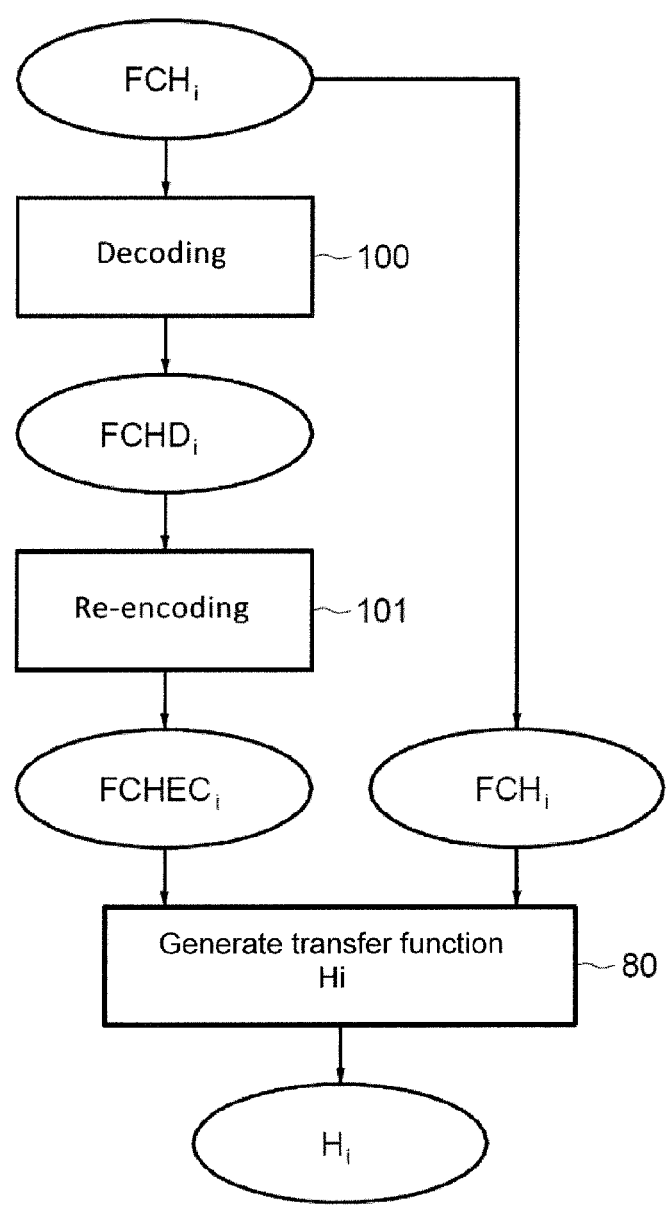

FIG. 10 illustrates an example of estimating a transfer function $H_i$ of the channel on the basis of the symbol $FCH_i$ of the header received. The decoding (step 100) of the symbol received $FCH_i$ is undertaken firstly. In this regard, the decoding means conventionally comprise means/circuitry configured to remove the cyclic prefix from each symbol, followed by means/circuitry configured to perform the direct fast Fourier transform FFT.

The decoding means also comprise demapping means or a demapper providing for each carrier a value of the corresponding modulation coefficient (bin). These demapping means are followed by a module configured to determine for each modulation coefficient an indication of confidence (soft decision) of the value. This module is conventional and known per se and uses, for example, an algorithm of the LogMAP type.

The decoding means also comprise deinterleaving means or a de-interleaver followed by a decoder, for example, a decoder of Viterbi type, followed by means/circuitry able to perform a parity check. The output of these means is connected to the sub-stage ET20 output terminal BS which is connected to the means forming the MAC layer of the receiver. Since the various symbols $FCH_i$ are referenced with respect to the preceding symbols in the frame, it is necessary to decode all the symbols $FCH_i$ of the header with the decoding means mentioned hereinabove. Next, after verification that the parity check is correct, it is possible to obtain the various decoded symbols $FCHD_i$.

A re-encoding of each of these symbols $FCHD_i$ is then performed in step 101 by using a convolutional encoder, an interleaver and a mapping means analogous to the corresponding means ENC, INTL, MP illustrated in FIG. 1 for the sender part. It will be noted in this regard that we remain in the frequency domain. Re-encoded symbols $FCHEC_i$ corresponding to the transmitted symbols are then obtained.

It is then possible, in step 80 analogous to step 80 of FIG. 8, to obtain the transfer functions $H_i$ associated with the various symbols $FCH_i$ on the basis of these received symbols $FCH_i$ and of the re-encoded symbols $FCHEC_i$. Whereas it would be possible for fourteen of the transfer functions $H_i$ to be used directly for the subsequent decoding of the symbols P0, P1, . . . of the useful field PLD of the frame, it is preferable to reduce this number of transfer functions so as to improve the signal-to-noise ratio.

Figure 11:
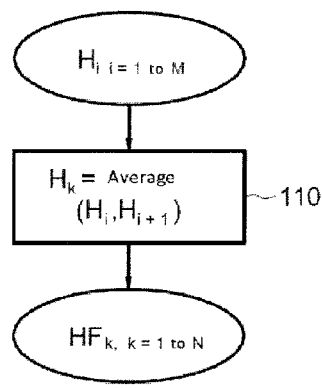
Figure 12:
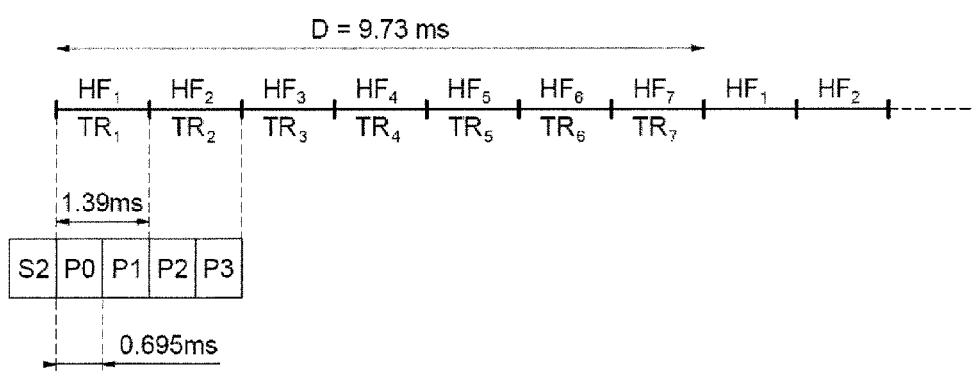
FIG. 12 is a schematic diagram of a transfer function, according to the present disclosure.

Thus, as illustrated in FIG. 11, on the basis of the M transfer functions $H_i$ (M=15) we shall obtain, by performing a pair wise average of some of the transfer functions $H_i$ (step 110), the N (N=7 e.g.) transfer functions $HF_k$, k varying from 1 to N, respectively associated with the N (=7) time slices $TR_1$-$TR_7$ (FIG. 12). The duration of each time slice is equal to the duration of two symbols P of the useful field PLD, i.e. 1.39 ms.

Therefore, the total duration D of all the time slices $TR_1$-$TR_7$ is equal to 9.73 ms, this being slightly less than the cyclostationary period PC (10 ms). Thus, here the period PC is between N (=7) times and N+1 (=8) times 1.39 ms. In step 110, to obtain the seven transfer functions $HF_k$, fourteen transfer functions $H_i$ are chosen from among the fifteen transfer functions obtained on the basis of the fifteen reference symbols.

The transfer functions $H_2$-$H_{15}$ will, for example, be chosen. And, in this case, the transfer function $HF_1$ is equal to the average of the transfer functions $H_2$ and $H_3$. The transfer function $HF_2$ is equal to the average of the transfer functions $H_3$ and $H_4$, and so on and so forth until the transfer function $HF_A$ which is equal to the average of the transfer functions $H_{14}$ and $H_{15}$ is obtained.

As illustrated in FIG. 12, the transfer function $HF_k$ which is associated with the time slice $TR_k$ containing the symbol to be decoded will be used to decode the symbols P0, P1, P2 . . . which follow the last reference symbol S2. The transfer function used is taken into account, as is known by the person skilled in the art, at the level of the demapping means incorporated into the decoding means. And, the transfer functions of the sequence of N transfer functions $HF_1$-$HF_7$ will be used successively and cyclically. Stated otherwise, once the complete cycle of seven transfer functions $HF_1$-$HF_7$ has been used, the cycle is recommenced with the use of the transfer function $HF_1$ up to $HF_7$ and so on and so forth.

That being so, when the duration D of the N time slices is different from the cyclostationary period, there will progressively be a time shift between the cycle of the transfer functions $HF_1$-$HF_7$ and the cyclostationary period of the channel. Stated otherwise, at a given moment, there will be a time gap equal to a time slice between the cycle of the transfer functions and the channel variation cycle.

Figure 13:
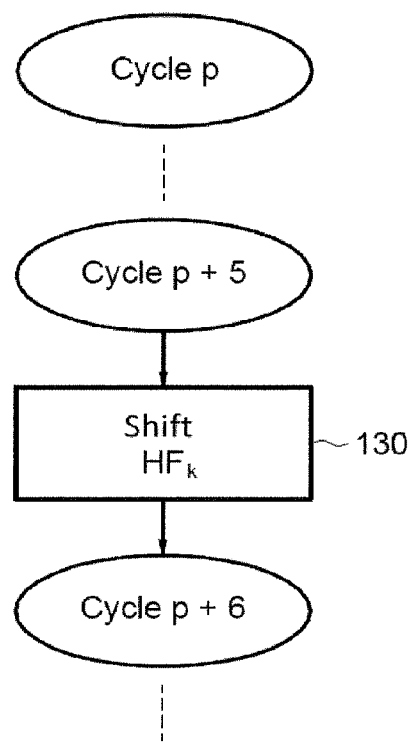
FIGS. 13-14 are flowcharts illustrating methods, according to the present disclosure.

It is then appropriate to perform a shift of transfer function in this successive and cyclic use of the transfer functions. This is illustrated schematically in FIG. 13. In the present case, with a duration D equal to 9.73 ms and a cyclostationary period of 10 ms, this shift is undertaken after five transfer function cycles and for the execution of the sixth cycle, the transfer function $HF_7$ will be reused a second time instead of using the transfer function $HF_1$ directly.

Figure 14:
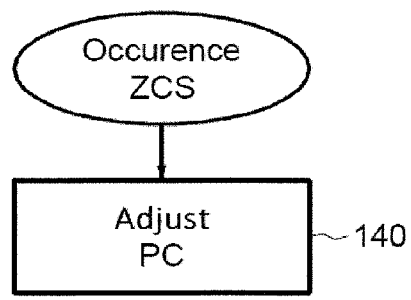

Of course, after having used the transfer function $HF_7$ a second time, the cycle of the transfer functions $HF_1$-$HF_7$ is resumed. It may also happen that the value of the cyclostationary period, which is directly related to the period of the alternating signal flowing on the electrical line, is time-shifted because of a time shift of the period of the alternating electrical signal on the line. This can be corrected by means of a reference signal ZCS (FIG. 14) which is delivered at each "0" crossing of the alternating current or voltage. And, in this case, the estimation means are configured to adjust (step 140) the value of the cyclostationary period of the channel on the basis of the occurrences of the reference signal ZCS.

That which is claimed is:

1. A method for processing an analog channel signal from a transmission channel, the analog channel signal conveying a plurality of frames, the transmission channel being linear and cyclostationary for a duration of at least one frame of the plurality of frames, the method comprising:
    converting the analog channel signal into a digital channel signal;
    performing a plurality of channel estimations for the at least one frame based upon the digital channel signal to generate a sequence of N transfer functions of the transmission channel, wherein;
        the sequence of N transfer functions is respectively associated with N successive time slices,
        a duration of the N successive time slices is equal to or less than a cyclostationary period of the transmission channel, and
        N is a positive integer; and
    decoding at least some symbols of the at least one frame using, for each of the at least some symbols, a transfer function associated with a successive time slice of the N successive time slices including a respective symbol.

2. The method according to claim 1, wherein the generation of the sequence of N transfer functions comprises generating an initial sequence of M base transfer functions respectively associated with M successive reference symbols of the at least one frame, the M successive reference symbols temporally covering a period equal to or greater than the cyclostationary period, the sequence of N transfer functions being derived from the initial sequence of M base transfer functions, wherein M is a positive integer.

3. The method according to claim 2, wherein the analog channel signal is from a digital-analog conversion of an initial digital signal; and
    wherein when a sampling frequency of the digital channel signal is different from a sampling frequency of the initial digital signal, the plurality of channel estimations comprises:
        estimating the initial sequence of M base transfer functions respectively performed based upon the M successive reference symbols of the at least one frame; and
        correcting the initial sequence of M base transfer functions with a phase shift corresponding to a sampling frequency offset to generate the initial sequence of M base transfer functions.

4. The method according to claim 2, wherein the sequence of N transfer functions comprises averages of successive groups of at least some of the initial sequence of M base transfer functions.

5. The method according to claim 4, wherein M is equal 15; wherein N is equal to 7; and wherein the sequence of N transfer functions is averages taken two by two of fourteen successive transfer functions of the initial sequence of M base transfer functions.

6. The method according to claim 2, wherein the M successive reference symbols of the at least one frame correspond to a plurality of known symbols of the at least one frame, the M successive reference symbols being decoded without knowing a transfer function of the transmission channel.

7. The method according to claim 6, wherein each channel estimation is based upon a received decodable symbol and is performed by steps comprising:
    decoding of the received decodable symbol;
    re-encoding of the received decodable symbol to generate a re-encoded symbol; and
    determining the transfer function of the transmission channel based upon the re-encoded symbol and the received decodable symbol.

8. The method according to claim 6, wherein each frame comprises a preamble sequence, a header following the preamble sequence, and a payload following the header; and wherein the M successive reference symbols is in the header and the payload.

9. The method according to claim 1, wherein the channel analog signal is modulated based upon an orthogonal frequency-division multiplexing (OFDM) modulation.

10. The method according to claim 9, wherein the channel analog signal is based upon a power-line communication (PLC) PLC-G3 standard.

11. The method according to claim 1, wherein the transmission channel comprises an electrical power-line, the channel analog signal being conveyed via power-line communication; and
    wherein the cyclostationary period of the transmission channel is half of a period of an alternating current flowing on the electrical power line.

12. The method according to claim 1, wherein decoding of symbols following a last reference symbol uses, successively and cyclically, the sequence of N transfer functions.

13. The method according to claim 12, wherein when the duration of the N successive time slices is different from the cyclostationary period, the decoding of the symbols following the last reference symbol also periodically comprises a shift of transfer function in the successive and cyclical use of the sequence of N transfer functions.

14. The method according to claim 1, wherein the channel analog signal is conveyed via a power-line communication, the cyclostationary period of the transmission channel being half of a period of an alternating current flowing on an electrical power line;
    wherein a reference signal is delivered at each zero crossing of the alternating current; and
    wherein a value of the cyclostationary period of the transmission channel is adjusted based upon an occurrence of the reference signal.

15. A receiver comprising:
    an analog to digital converter configured to receive an analog channel signal transmitted via a transmission channel and to convert the analog channel signal to a digital channel signal, the analog channel signal conveying a plurality of frames, the transmission channel being linear and cyclostationary for a duration of at least one frame of the plurality of frames; and
    a processor configured to
        perform a plurality of channel estimations for the at least one frame based upon the digital channel signal to generate a sequence of N transfer functions of the transmission channel, wherein the sequence of N transfer functions is respectively associated with N successive time slices, a duration of the N successive time slices is equal to or less than a cyclostationary period of the transmission channel, and N is a positive integer, and
        decode at least some symbols of the at least one frame using, for each of the at least some symbols, a transfer function associated with a successive time slice of the N successive times slices including a respective symbol.

16. The receiver according to claim 15, wherein the processor is configured to generate the sequence of N transfer functions by generating an initial sequence of M base transfer functions respectively associated with M successive reference symbols of the at least one frame, the M successive reference symbols temporally covering a period equal to or greater than the cyclostationary period, the sequence of N transfer functions being derived from the initial sequence of M base transfer functions, wherein M is a positive integer.

17. The receiver according to claim 16, wherein the analog channel signal is from a digital-analog conversion of an initial digital signal; and
    wherein when a sampling frequency of the digital channel signal is different from a sampling frequency of the initial digital signal, the processor is configured to perform the plurality of channel estimations by:
    estimating the initial sequence of M base transfer functions respectively performed based upon the M successive reference symbols of the at least one frame; and
    correcting the initial sequence of M base transfer functions with a phase shift corresponding to a sampling frequency offset to generate the initial sequence of M base transfer functions.

18. The receiver according to claim 16, wherein the processor is configured to generate the sequence of N transfer functions comprising averaging successive groups of at least some of the initial sequence of M base transfer functions.

19. The receiver according to claim 18, wherein M is equal 15;
    wherein N is equal to 7; and
    wherein the processor is configured to generate the sequence of N transfer functions as averages taken two by two of fourteen successive transfer functions of the initial sequence of M base transfer functions.

20. The receiver according to claim 16, wherein the M successive reference symbols of the at least one frame correspond to a plurality of known symbols of the at least one frame, the M successive reference symbols being decoded without knowing a transfer function of the transmission channel.

21. The receiver according to claim 20 wherein the processor is configured to perform each channel estimation based upon a received decodable symbol by:
    decoding of the received decodable symbol;
    re-encoding of the received decodable symbol to generate a re-encoded symbol; and determining a transfer function of the transmission channel based upon the re-encoded symbol and the received decodable symbol.

22. The receiver according to claim 20, wherein each frame comprises a preamble sequence, a header following the preamble sequence, and a payload following the header; and
wherein the M successive reference symbols is in the header and the payload.

23. The receiver according to claim 15, wherein the channel analog signal is modulated based upon an orthogonal frequency-division multiplexing (OFDM) modulation.

24. The receiver according to claim 15, wherein the transmission channel comprises an electrical power line, the channel analog signal being conveyed via a power-line communication; and
wherein the cyclostationary period of the transmission channel is half of a period of an alternating current flowing on the electrical power line.

25. The receiver according to claim 24, wherein the channel analog signal is based upon a power-line communication (PLC) PLC-G3 standard.

26. The receiver according to claim 15, wherein decoding of symbols following a last reference symbol uses, successively and cyclically, the sequence of N transfer functions.

27. The receiver according to claim 26, wherein when the duration of the N successive time slices is different from the cyclostationary period, the processor is configured to decode the symbols following the last reference symbol periodically comprising a shift of transfer function in the successive and cyclical use of the sequence of N transfer functions.

28. The receiver according to claim 26 further comprising an input stage comprising the analog to digital converter, wherein the channel analog signal is conveyed via a power-line communication, the cyclostationary period of the transmission channel being half of a period of an alternating current flowing on an electrical power line;
wherein the input stage is configured to generate a reference signal at each zero crossing of the alternating current; and
wherein the processor is configured to adjust a value of the cyclostationary period of the transmission channel based upon an occurrence of the reference signal.

29. An electronic device comprising:
an input stage to be coupled to a transmission channel and configured to receive an analog channel signal;
a converter stage configured to convert the analog channel signal to a digital channel signal, the analog channel signal conveying a plurality of frames; and
a processor configured to
perform a plurality of channel estimations for the at least one frame of the plurality of frames based upon the digital channel signal to generate a sequence of N transfer functions of the transmission channel, wherein the sequence of N transfer functions is respectively associated with N successive time slices, a duration of the N successive time slices is equal to or less than a cyclostationary period of the transmission channel, and N is a positive integer, and
decode at least some symbols of the at least one frame using, for each of the at least some symbols, a transfer function associated with a successive time slice of the N successive time slices including a respective symbol.

30. The electronic device according to claim 29, wherein the processor is configured to generate the sequence of N transfer functions by generating an initial sequence of M base transfer functions respectively associated with M successive reference symbols of the at least one frame, the M successive reference symbols temporally covering a period equal to or greater than the cyclostationary period, the sequence of N transfer functions being derived from the initial sequence of M base transfer functions, wherein M is a positive integer.

31. The electronic device according to claim 30, wherein the analog channel signal is from a digital-analog conversion of an initial digital signal; and
wherein when a sampling frequency of the digital channel signal is different from a sampling frequency of the initial digital signal, the processor is configured to perform the plurality of channel estimations by performing a method comprising:
estimating the initial sequence of M base transfer functions respectively performed based upon the M successive reference symbols of the at least one frame; and
correcting the initial sequence of M base transfer functions with a phase shift corresponding to a sampling frequency offset to generate the initial sequence of M base transfer functions.

32. The electronic device according to claim 30, wherein the processor is configured to generate the sequence of N transfer functions comprising averaging successive groups of at least some of the initial sequence of M base transfer functions.

33. A receiver comprising:
means for an input stage configured to be coupled to a transmission channel to receive an analog channel signal;
means for a converter stage configured to convert the analog channel signal to a digital channel signal, the analog channel signal conveying a plurality of frames, the transmission channel being linear cyclostationary for a duration of at least one frame of the plurality of frames; and
means for a processor configured to
perform a plurality of channel estimates for the at least one frame based upon the digital channel signal to generate a sequence of N transfer functions of the transmission channel, wherein the sequence of N transfer functions is respectively associated with N successive time slices, a duration of the N successive time slices is equal to or less than a cyclostationary period of the transmission channel, and N is a positive integer, and
decode at least some symbols of the at least one frame using, for each of the at least some symbols, a transfer function associated with a successive time slice of the N successive time slices including a respective symbol.

* * * * *

UNITED STATES PATENT AND TRADEMARK OFFICE
CERTIFICATE OF CORRECTION

PATENT NO.        : 9,838,077 B2
APPLICATION NO.   : 15/042509
DATED             : December 5, 2017
INVENTOR(S)       : Pierre Demaj et al.

Page 1 of 1

It is certified that error appears in the above-identified patent and that said Letters Patent is hereby corrected as shown below:

In the Claims

In Column 16, Line 42, Claim 33, delete "the transmission channel being linear cyclostationary" and insert --the transmission channel being linear and cyclostationary--.

In Column 16, Line 46, Claim 33, delete "estimates" and insert --estimations--.

Signed and Sealed this
Nineteenth Day of June, 2018

Andrei Iancu
*Director of the United States Patent and Trademark Office*